US009064442B2

(12) United States Patent
Kimura (10) Patent No.: US 9,064,442 B2
(45) Date of Patent: Jun. 23, 2015

(54) HEAD MOUNTED DISPLAY APPARATUS AND METHOD OF CONTROLLING HEAD MOUNTED DISPLAY APPARATUS

(71) Applicant: Seiko Epson Corporation, Tokyo (JP)

(72) Inventor: Fusashi Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 13/791,380

(22) Filed: Mar. 8, 2013

(65) Prior Publication Data

US 2013/0241948 A1 Sep. 19, 2013

(30) Foreign Application Priority Data

Mar. 16, 2012 (JP) .................. 2012-059547

(51) Int. Cl.
*G09G 5/02* (2006.01)
*G09G 5/00* (2006.01)
*G02B 27/01* (2006.01)
*H04N 13/04* (2006.01)

(52) U.S. Cl.
CPC .................. *G09G 5/02* (2013.01); *G09G 5/006* (2013.01); *G09G 2370/18* (2013.01); *G02B 27/017* (2013.01); *G02B 2027/0178* (2013.01); *G02B 2027/0118* (2013.01); *G02B 2027/014* (2013.01); *H04N 13/044* (2013.01)

(58) Field of Classification Search
CPC ....... G09G 5/006; G09G 5/02; G02B 27/017; H04N 13/0044
USPC ......................................... 345/8, 629; 348/53
See application file for complete search history.

(56) References Cited

U.S. PATENT DOCUMENTS

| 8,045,825 B2* | 10/2011 | Shimoyama et al. ......... 382/284 |
| 2007/0285346 A1* | 12/2007 | Li ..................................... 345/8 |
| 2010/0225566 A1* | 9/2010 | Sato .................................. 345/8 |
| 2013/0336631 A1* | 12/2013 | Kura ............................. 386/230 |

FOREIGN PATENT DOCUMENTS

JP 2009-92810 A 4/2009

* cited by examiner

*Primary Examiner* — Dwayne Bost
*Assistant Examiner* — Chineyere Wills-Burns
(74) *Attorney, Agent, or Firm* — ALG Intellectual Property, LLC (57) ABSTRACT

An optical transmission-type head mounted display apparatus includes an acquisition unit that acquires image data; an image display unit that generates image light based on the image data, and outputs the image light in order to cause a user to see the image light as a virtual image; and a control unit that performs control so as to reduces an output level of the image light corresponding to a part of regions of the virtual image from among the image light to a level at which the user cannot see the virtual image in a specific condition.

12 Claims, 5 Drawing Sheets

HEAD MOUNTED DISPLAY APPARATUS AND METHOD OF CONTROLLING HEAD MOUNTED DISPLAY APPARATUS

BACKGROUND

1. Technical Field

The present invention relates to an optical transmission-type head mounted display apparatus which enables a user to see an outside view, and a method of controlling the head mounted display apparatus.

2. Related Art

As one of head mounted display apparatuses worn on the head, an optical transmission-type head mounted display apparatus, which enables a user to see an outside view together with an image when the user wears it, has been known. The optical transmission-type head mounted display apparatus causes the user to see a virtual image by generating image light which shows an image, such as video content, and guides the generated image light into the eyes of the user using an optical projection system or a light-guiding plate. Meanwhile, in this specification, the virtual image which is seen by the user using the head mounted display apparatus is appropriately referred to as a "display image".

In the optical transmission-type head mounted display apparatus, when the display image is large, there are cases in which it is difficult for the user to see the outside view due to the influence of the display image. Here, a technology has been known (for example, refer to JP-A-2009-92810) which makes a user easily see text and diagrams without damaging the visibility of an outside view by changing the color of a background section when an image which includes the background, the text, and the diagrams is displayed in an optical transmission-type head mounted display apparatus.

However, in the above-described optical transmission-type head mounted display apparatus in the related art, there are cases in which it is difficult for the user to see the outside view with regard to text and diagram sections.

SUMMARY

An advantage of some aspects of the invention is to provide a technology which improves the visibility of an outside view when an image is displayed in an optical transmission-type head mounted display apparatus.

The invention can be implemented as the following forms or application examples.

Application Example 1

This application example is directed to an optical transmission-type head mounted display apparatus including: an acquisition unit that acquires image data; an image display unit that generates image light based on the image data, and outputs the image light in order to cause a user to see the image light as a virtual image; and a control unit that performs control so as to reduce an output level of the image light corresponding to a part of regions of the virtual image from among the image light to a level at which the user cannot see the virtual image in a specific condition.

In the optical transmission-type head mounted display apparatus, the acquisition unit acquires original image data, the image display unit generates the image light based on the original image data, and outputs the image light in order to cause the user of the head mounted display apparatus to see the image light as the virtual image. In the specific condition, the control unit performs control such that the output level of a part of the image light from among the image light is reduced to the level at which the user cannot see the virtual image. Therefore, in the head mounted display apparatus, even when the display image and the outside view, which are formed on the image display unit, overlap with each other, it is possible to enhance the visibility of the outside view while the user sees the display image.

Application Example 2

This application example is directed to the head mounted display apparatus according to Application Example 1, wherein the image display unit includes an image forming panel which includes a plurality of pixels and outputs the image light, and the control unit, as the control, converts a part of the plurality of pixels into non-display pixels in which the output level of the image light is reduced to the level at which the user cannot see the virtual image.

In the head mounted display apparatus, the image display unit includes the image forming panel which includes the plurality of pixels and outputs the image light. The control unit, as the control, converts a part of the plurality of pixels into the non-display pixels in which the output level of the image light is reduced to the level at which the user cannot see the virtual image. Therefore, in the head mounted display apparatus, it is possible to increase the transmittance of the display image using a simple method.

Application Example 3

This application example is directed to the head mounted display apparatus according to Application Example 2, wherein the pixels is formed in a square lattice shape in the image forming panel, and, when the control is performed, a plurality of non-display pixel groups, each which includes N (N is an integer which is equal to or greater than 1) non-display pixels of the image forming panel, and a plurality of display pixel groups, each which includes N display pixels outputting the output level of the image light as a level at which the user can see the virtual image, are alternately arranged in the image forming panel.

In the head mounted display apparatus, the pixels are formed in a square lattice shape in the image forming panel. The plurality of non-display pixel groups, each of which includes N non-display pixels of the image forming panel, and the plurality of display pixel groups, each of which includes N display pixels outputting the output level of the image light as the level at which the user can see the virtual image, are alternately arranged in the image forming panel. Therefore, in the head mounted display apparatus, it is possible to cause the user to see the display image which does not cause feeling of a sense of discomfort, and to enhance the visibility of the outside view.

Application Example 4

This application example is directed to the head mounted display apparatus according to Application Example 2, wherein when the control is performed, a ratio of a number of non-display pixels to a total number of pixels of the image forming panel differs depending on a position on the image forming panel.

In the head mounted display apparatus, since the ratio of the number of non-display pixels to the total number of pixels of the image forming panel, which can output the image light, differs depending on the position on the image forming panel, it is possible to enhance the visibility of the display image and the outside view which penetrates.

Application Example 5

This application example is directed to the head mounted display apparatus according to Application Example 4, wherein the ratio in a center of the image forming panel is lower than the ratio in circumference of the image forming panel.

In the head mounted display apparatus, since the ratio of the number of non-display pixels to the total number of pixels which are in the center of the image forming panel and may output the image light is lower than the ratio in the circumference of the image forming panel, it is possible to enhance the visibility of the display image and the outside view which penetrates.

Application Example 6

This application example is directed to the head mounted display apparatus according to any one of Application Examples 2 to 5, wherein the control includes control which is performed to reduce brightness of the display pixels which output the output level of the image light to the level at which the user can see the virtual image.

In the head mounted display apparatus, since the control unit reduces the output of the image light from a part of the pixels of the image forming panel, and, in addition, reduces the brightness of the display pixels which are output at the level at which the user can see the virtual image, it is possible to enhance the visibility of the outside view.

Application Example 7

This application example is directed to the head mounted display apparatus according to any one of Application Examples 1 to 6, which further includes an operation unit that receives an operation from the user, wherein the specific condition is a case in which the operation unit receives an operation for performing the control.

This head mounted display apparatus includes the operation unit that receives an operation from the user. Since, the control unit performs control when the operation unit receives an operation of the user, it is possible to adjust the transmittance of the display image depending on the intention of the user, and it is possible to enhance the convenience.

Application Example 8

This application example is directed to the head mounted display apparatus according to Application Example 7, wherein the control unit automatically performs the control when the operation unit receives an operation which causes the image display unit to generate the image light based on the image data.

In the head mounted display apparatus, when the operation unit receives the operation which causes the image display unit to generate the image light based on the original image data, the control unit controls the image display unit such that the output of a part of the image light from among the image light is automatically reduced. Therefore, it is possible for the user to increase the transmittance of the display image without specially requiring an operation, and it is possible to enhance the visibility of the outside view.

Application Example 9

This application example is directed to the head mounted display apparatus according to any one of Application Examples 1 to 8, wherein the specific condition is that the image data is image data of a still image.

In the head mounted display apparatus, when the original image data is the image data of the still image, the control unit controls the image display unit such that the output of the part of the image light from among the output image light is reduced. Therefore, it is possible to cause the user to see an appropriate display image depending on the original image data, and it is possible to enhance the visibility of the outside view.

Application Example 10

This application example is directed to the head mounted display apparatus according to any one of Application Examples 7 to 9, which further includes: a detection unit that detects a positional state of the head mounted display apparatus, wherein the image display unit is worn on a head of the user, the operation unit is separated from the image display unit, and the specific condition is a case in which the detected state is a specific state.

In the head mounted display apparatus, the image display unit is worn on the head of the user, and the operation unit is separated from the image display unit. The head mounted display apparatus further includes the detection unit that detects the positional state of the head mounted display apparatus. The control unit performs control such that the output of the part of image light is reduced based on the positional state of the head mounted display apparatus which is detected by the detection unit. Therefore, in the head mounted display apparatus, it is possible to provide the transmittance of the display image depending on an object to the user without specially requiring an operation.

Application Example 11

This application example is directed to the head mounted display apparatus according to Application Example 10, wherein the state is acceleration of the head mounted display apparatus, and the specific state is a state in which the acceleration is equal to or greater than a specific value.

In the head mounted display apparatus, when the detection unit detects that the head mounted display apparatus moves at a speed which is equal to or greater than the specific acceleration, the control unit performs control such that the output of a part of the image light is reduced. Therefore, it is possible to cause the user to see the display image which does not cause feeling of a sense of discomfort.

Application Example 12

This application example is directed to the head mounted display apparatus according to Application Example 11, wherein if a specific time elapses from a point of time that acceleration which is equal to or greater than the specific value is not detected after the acceleration which is equal to or greater than the specific value is detected, the control unit outputs the output level of the image light corresponding to a part of the regions, the levels of which are reduced to the level at which the user cannot see the virtual image, as a level at which the user can see the virtual image.

In the head mounted display apparatus, if the specific time elapses from the point of time that the acceleration which is equal to or greater than the specific value is not detected after the acceleration which is equal to or greater than the specific value is detected, the control unit outputs the image light, which is decreased in a part of regions of the image display unit and then output, as a level at which the user can see it again. Therefore, it is possible to easily see a display image by providing the appropriate transmittance of the display image on which the intention of the user is reflected.

Application Example 13

This application example is directed to the head mounted display apparatus according to Application Example 10, wherein the detection unit includes a signal transmission unit which is arranged in the operation unit, and a signal reception unit which receives a signal transmitted from the signal transmission unit arranged in the image display unit, the state is a state of a positional relationship between the operation unit and the image display unit, which is acquired from the signal transmission unit and the signal reception unit, and the specific state is a state in which a position of the operation unit overlaps with the virtual image.

In the head mounted display apparatus, the detection unit includes the signal transmission unit which is arranged in the operation unit, and the signal reception unit which receives a signal transmitted from the signal transmission unit arranged in the image display unit. When the position of the operation unit overlaps with the generated virtual image in the state of a positional relationship between the operation unit and the image display unit, which is acquired from the signal transmission unit and the signal reception unit, the control unit performs control such that the output level of the image light in a part of the regions of the image display unit is reduced to the level at which the user cannot see the virtual image. Therefore, in the head mounted display apparatus, since the transmittance of the display image in the image display unit is automatically increased depending on the operation of the user, it is possible to enhance the convenience of the user.

Meanwhile, the invention can be implemented in various types of aspects and can be implemented, for example, in the forms of the optical transmission-type display apparatus and a method of controlling the display apparatus, the optical transmission-type head mounted display apparatus and a method of controlling the head mounted display apparatus, an information processing system, a head-mounted display system, a computer program which is used to implement the functions of these method, apparatuses, and systems, a recording medium which records the computer program, and a data signal which is realized in carrier waves by including the computer program.

BRIEF DESCRIPTION OF THE DRAWINGS

The invention will be described with reference to the accompanying drawings, wherein like numbers reference like elements.

DESCRIPTION OF EXEMPLARY EMBODIMENTS

Subsequently, embodiments of the invention will be described based on examples in order below.
A. First Example:
A-1. Apparatus Configuration:
A-2. Control Process:
B. Second Example:
C. Modification Example:

A. First Example

A-1. Apparatus Configuration

Figure 1:
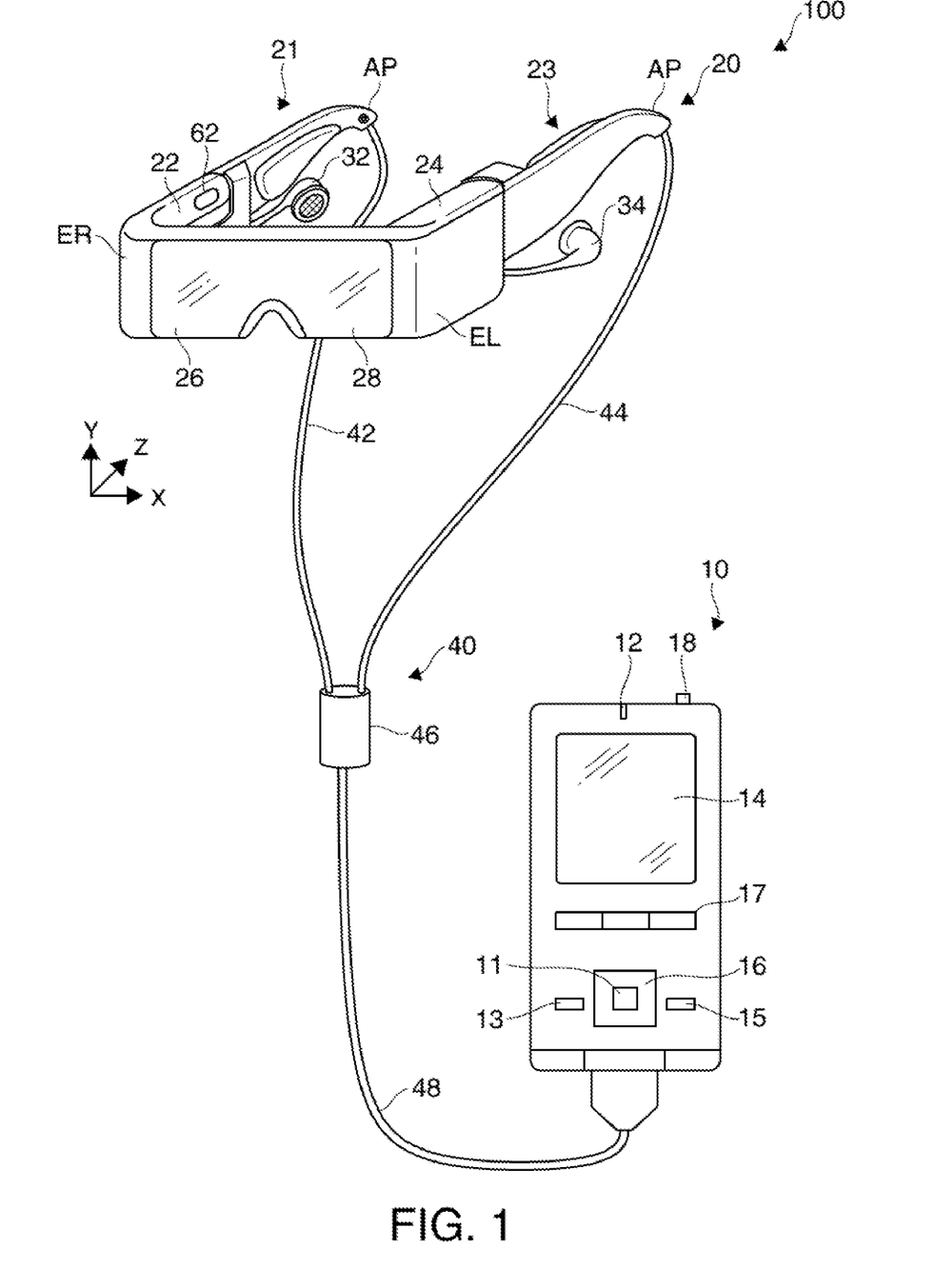
FIG. 1 is an explanatory view illustrating the external configuration of a head mounted display apparatus according to an embodiment of the invention.

FIG. 1 is an explanatory view illustrating the external configuration of a head mounted display apparatus 100 according to an embodiment of the invention. The head mounted display apparatus 100 is a display apparatus which is worn on the head, and is called a Head Mounted Display (HMD). The head mounted display apparatus 100 of the embodiment is an optical transmission-type head mounted display apparatus which enables a user to see a virtual image and to directly see an outside view at the same time.

The head mounted display apparatus 100 includes an image display unit 20 which causes the user to see the virtual image in a state in which the image display unit 20 is worn on the head of the user, and a control unit (controller) 10 which controls the image display unit 20.

The image display unit 20 is a worn body which is worn on the head of the user, and is formed in a glasses shape in the embodiment. The image display unit 20 includes a right holding unit 21, a right display driving unit 22, a left holding unit 23, a left display driving unit 24, a right optical image display unit 26, a left optical image display unit 28, and a detection unit 62. The right optical image display unit 26 and the left optical image display unit 28 are arranged at positions corresponding to the front of the right and left eyes of the user when the head mounted display apparatus 100 is worn. One end of the right optical image display unit 26 is connected to one end of the left optical image display unit 28 at a position which corresponds to the middle of the forehead of the user when the head mounted display apparatus 100 is worn. The right holding unit 21 is extended from an end portion ER which is the other end of the right optical image display unit 26. Similarly, the left holding unit 23 is extended from an end portion EL which is the other end of the left optical image display unit 28.

The image display unit 20 further includes a right ear phone 32 and a left ear phone 34. The right ear phone 32 and the left ear phone 34 are worn on the right and left ears, respectively, when the user wears the image display unit 20.

The right holding unit 21 is a member which is extended from the other end ER of the right optical image display unit 26 so as to be approximately perpendicular to the right optical image display unit 26 and is worn at a position corresponding to the temporal region of the head of the user when the head mounted display apparatus 100 is worn. In the same manner, the left holding unit 23 is a member which is extended from the other end EL of the left optical image display unit 28 so as to be approximately perpendicular to the left optical image display unit 28 and is worn at a position corresponding to the temporal region of the head of the user when the head mounted display apparatus 100 is worn. The right holding unit 21 and the left holding unit 23 hold the head mounted display apparatus 100 on the head of the user like the temples of glasses.

The right display driving unit 22 is arranged on the inside of the right holding unit 21 (in other words, a side facing the head of the user when the head mounted display apparatus 100 is worn) and on the side of the end portion ER of the right optical image display unit 26. In addition, the left display driving unit 24 is arranged on the inside of the left holding unit 23 and on the side of the end portion EL of the left optical image display unit 28. Meanwhile, hereinafter, the right display driving unit 22 and the left display driving unit 24 are simply and collectively called the "display driving unit" and the right optical image display unit 26 and the left optical image display unit 28 are simply and collectively called the "optical image display unit".

The display driving unit 22 or 24 includes a Liquid Crystal Display (LCD) and an optical projection system which is not shown in the drawing. The details thereof will be described later. The optical image display unit 26 or 28 used as an optical member includes a light-guiding plate and a dimming plate which are not shown in the drawing. The light-guiding plate is formed of an optically transparent resin material, and outputs image light, which is received from the display driving unit 22 or 24, toward an eye of the user. The dimming plate is a laminated optical element, and is arranged to cover the front side (a side which is opposite to the side of an eye of the user) of the head mounted display apparatus 100. The dimming plate can protect the light-guiding plate, suppress the damage to the light-guiding plate or the adhesion of dirt, adjust the amount of external light which enters an eye of the user by adjusting the light transmittance of the dimming plate, and adjust the ease of seeing the virtual image. Meanwhile, the dimming plate can be omitted.

The detection unit 62 is arranged inside the housing of the right display driving unit 22. The detection unit 62 is an acceleration sensor which detects the acceleration of the image display unit 20. The detection unit 62 of the embodiment is a 3-axis acceleration sensor in a voltage output manner, and detects the acceleration of the three axes (an X-axis, a Y-axis, and a Z-axis) of the image display unit 20. The detection unit 62 can detect gravitational acceleration or the inclination of the image display unit 20.

The image display unit 20 further includes a connection unit 40 which is used to connect the image display unit 20 to the control unit 10. The connection unit 40 includes a main body cord 48 which is connected to the control unit 10, a right cord 42 and a left cord 44 which are obtained by dividing the main body cord 48 into two cords, and a connection member 46 which is provided at a division point. The right cord 42 is inserted into the housing of the right holding unit 21 from the tip AP of the right holding unit 21 in the extension direction, and connected to the right display driving unit 22. In the same manner, the left cord 44 is inserted into the housing of the left holding unit 23 from the tip AP of the left holding unit 23 in the extension direction, and connected to the left display driving unit 24.

The image display unit 20 and the control unit 10 transmit various types of signals via the connection unit 40. At an end portion of the main body cord 48, which is opposite to the connection member 46, and the control unit 10, connectors (not shown) which are fit thereto are provided, respectively. The control unit 10 is connected to or separated from the image display unit 20 by mating/de-mating the connector of the main body cord 48 with the connector of the control unit 10. For example, a metal cable or optical fiber can be used for the right cord 42, the left cord 44, and the main body cord 48.

The control unit 10 is a device which is used to operate the head mounted display apparatus 100. The control unit 10 includes a determination key 11, a lighting unit 12, a display change key 13, a track pad 14, a brightness change key 15, a direction key 16, a menu key 17, and a power switch 18. The determination key 11 detects a pressing operation, and outputs a signal which is used to determine content operated by the control unit 10. The lighting unit 12 provides notification of the operational state (for example, power ON/OFF) of the head mounted display apparatus 100 depending on the light emitting state thereof. For example, a Light Emitting Diode (LED) can be used as the lighting unit 12. The display change key 13 detects the pressing operation, and outputs a signal which is used to, for example, convert the display mode of content video into 3D or 2D. The track pad 14 detects the operation of a finger of the user on the operation surface of the track pad 14, and outputs a signal according to detected content. Various types of track pads, such as an electrostatic type, pressure detection type, and optical type, can be used as the track pad 14. The brightness change key 15 detects a pressing operation, and outputs a signal which is used to increase or decrease the brightness of the image display unit 20. The direction key 16 detects a pressure operation on a key, which corresponds to vertical and horizontal directions, and outputs a signal according to detected content. The power switch 18 switches the power activation state of the head mounted display apparatus 100 by detecting a switch sliding operation.

Figure 2:
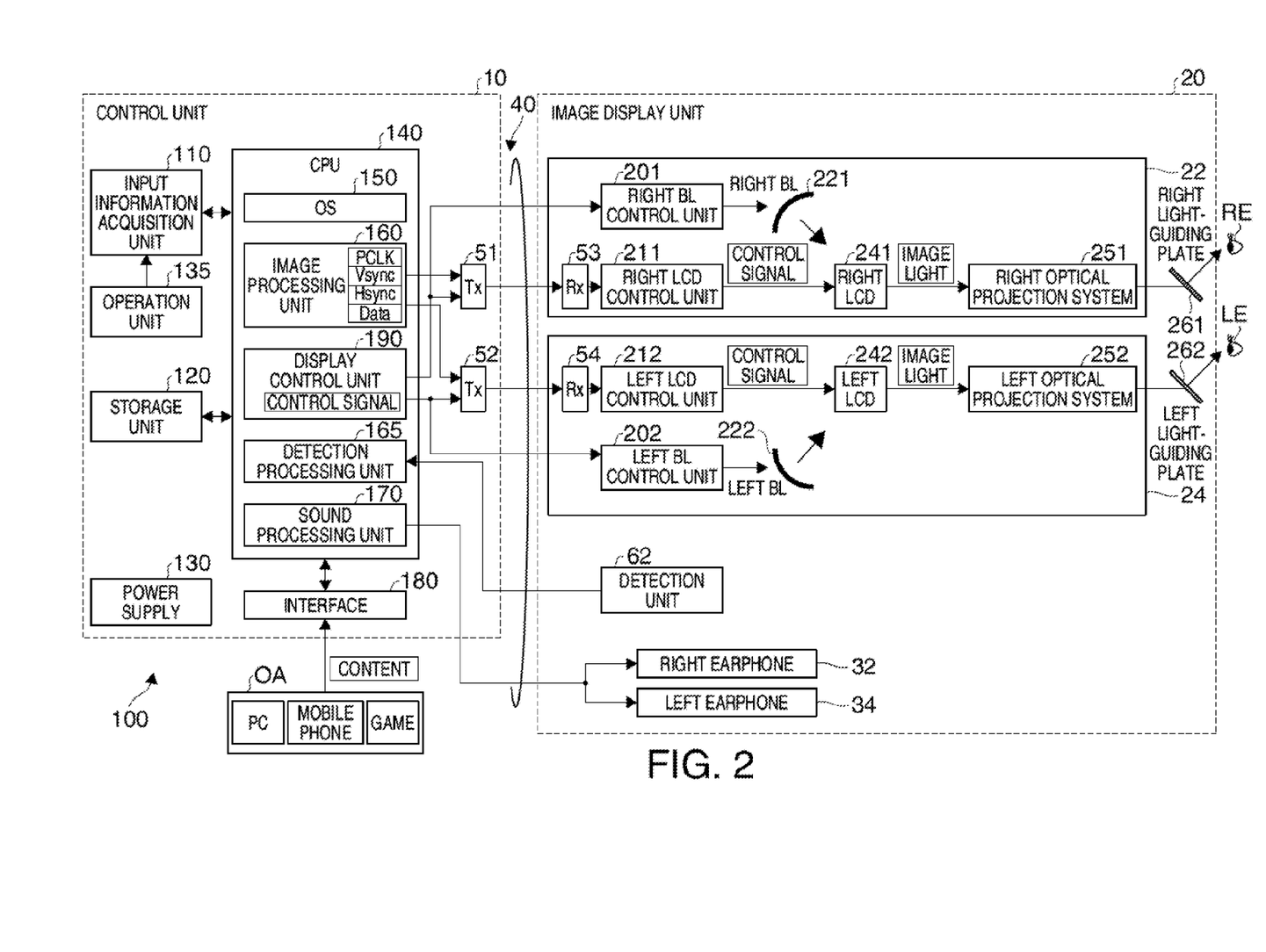
FIG. 2 is an explanatory view functionally illustrating the configuration of the head mounted display apparatus according to the embodiment.

FIG. 2 is an explanatory view functionally illustrating the configuration of the head mounted display apparatus 100 according to the embodiment. As shown in FIG. 2, the control unit 10 includes a CPU 140, an operation unit 135 (in the embodiment, the determination key 11, the display change key 13, the track pad 14, the brightness change key 15, the direction key 16, the menu key 17, and the power switch 18) which is operated by the user, an input information acquisition unit 110 which acquires a signal in response to an input operated by the user (for example, an input operated with respect to the track pad 14, the direction key 16, or the power switch 18), a storage unit 120 which includes a ROM or a RAM, a power supply 130 which supplies electric power to each of the units of the head mounted display apparatus 100, an interface 180 which is used to connect various types of external devices OA (for example, a Personal Computer (PC), a mobile phone terminal, and a game terminal) which are supply sources of content data, such as images (still images or moving images) or sounds, and transmission units (Tx) 51 and 52. For example, a rechargeable battery can be used as the power supply 130. For example, a USB interface, a memory card interface, and a wireless LAN interface can be used as the interface 180.

The storage unit 120 stores various types of computer programs, and the CPU 140 functions as an Operating System (OS) 150, an image processing unit 160, a display control unit 190, a sound processing unit 170, and a detection processing unit 165 by reading the computer programs from the storage unit 120 and executing the computer programs.

The image processing unit 160 generates a clock signal PCLK, a vertical synchronization signal VSync, a horizontal synchronization signal HSync, and image data Data based on content which is input via the interface 180, and supplies these signals to the image display unit 20 via the connection unit 40. More specifically, the image processing unit 160 acquires an image signal which is included in the content. For example, in a case of a moving image, the acquired image signal is generally an analog signal which includes 30 frame images per second. The image processing unit 160 separates the synchronization signal, such as the vertical synchronization signal VSync or the horizontal synchronization signal HSync, from the acquired image signal. In addition, the image processing unit 160 generates a clock signal PCLK using a Phase Locked Loop (PPL) circuit which is not shown in the drawing in response to the cycle of the separated vertical synchronization signal VSync or the horizontal synchronization signal HSync.

The image processing unit 160 converts the analog image signal, from which the synchronization signal is separated, into a digital image signal using an A/D conversion circuit which is not shown in the drawing. Thereafter, the image processing unit 160 stores the digital image signal which is obtained through the conversion in the DRAM of the storage unit 120 as the image data Data (RGB data) of a target image for each frame. Meanwhile, the image processing unit 160 may perform image processes, such as a resolution conversion process, various types of tone correction processes, called the adjustment of brightness and color saturation, and a keystone correction process, on the image data as necessary.

The image processing unit 160 respectively transmits the generated clock signal PCLK, the vertical synchronization signal VSync, the horizontal synchronization signal HSync, and the image data Data, which is stored in the DRAM of the storage unit 120, via the transmission units 51 and 52. Meanwhile, the image data Data which is transmitted via the transmission unit 51 is called "right eye image data", and the image data Data which is transmitted via the transmission unit 52 is called "left eye image data". The transmission units 51 and 52 function as transceivers for serial transmission between the control unit 10 and the image display unit 20.

The display control unit 190 generates a control signal which is used to control the display driving units 22 and 24. More specifically, the display control unit 190 individually controls the driving ON/OFF of a right LCD 241 using a right LCD control unit 211, the driving ON/OFF of a right backlight 221 using a right backlight control unit 201, the driving ON/OFF of a left LCD 242 using a left LCD control unit 212, the driving ON/OFF of a left backlight 222 using a left backlight control unit 202 in response to the control signal, thereby controlling the generation and output of image light using the respective display driving units 22 and 24. For example, the display control unit 190 causes both the right display driving unit 22 and the left display driving unit 24 to generate image light, causes only one side of them to generate image light, or causes both of them to not generate image light. Meanwhile, the right LCD 241 and the left LCD 242 are collectively referred to as "image forming panels".

The display control unit 190 transmits control signals to the right LCD control unit 211 and the left LCD control unit 212 via the transmission units 51 and 52, respectively. In addition, the display control unit 190 transmits control signals to the right backlight control unit 201 and the left backlight control unit 202, respectively.

The sound processing unit 170 acquires a sound signal included in the content data, amplifies the acquired sound signal, and supplies the amplified sound signal to the right earphone 32 and the left earphone 34 of the image display unit 20 via the connection unit 40.

The detection processing unit 165 acquires information indicative of a change in the speed of the image display unit 20. In the embodiment, the detection processing unit 165 acquires the acceleration of the image display unit 20 which is detected by the detection unit 62, and determines the acceleration and a preset threshold Th1 which is described below.

The image display unit 20 includes the right display driving unit 22, the left display driving unit 24, a right light-guiding plate 261 as the right optical image display unit 26, a left light-guiding plate 262 as the left optical image display unit 28, a detection unit 62, the right earphone 32, and the left earphone 34.

The right display driving unit 22 includes a reception unit (Rx) 53, a right backlight (BL) control unit 201 and a right backlight (BL) 221 which function as light sources, and a right LCD control unit 211 and a right LCD 241 which function as display elements, and a right optical projection system 251.

The reception unit 53 functions as a receiver which is used for the serial transmission between the control unit 10 and the image display unit 20. The right backlight control unit 201 has a function of driving the right backlight 221 in response to the input control signal. The right backlight 221 is a luminous body, for example, an LED or electroluminescence (EL). The right LCD control unit 211 has a function of driving the right LCD 241 in response to the clock signal PCLK, the vertical synchronization signal VSync, the horizontal synchronization signal HSync, and the right eye image data which are input via the reception unit 53. The right LCD 241 is a transmission-type liquid crystal panel in which a plurality of pixels are arranged.

The right optical projection system 251 includes a collimator lens which causes image light which is output from the right LCD 241 to be light flux in a parallel state. The right light-guiding plate 261 as the right optical image display unit 26 reflects image light which is output from the right optical projection system 251 along a specific light path and guides the image light to the right eye RE of the user. A light-guiding unit can use an arbitrary method in so far as a user is caused to see a virtual image using image light. For example, a diffraction grating may be used or a semitransparent reflection coating may be used.

The left display driving unit 24 includes a reception unit (Rx) 54, a left backlight (BL) control unit 202 and a left backlight (BL) 222 which function as light sources, and a left LCD control unit 212 and a left LCD 242 which function as display elements, and a left optical projection system 252. The right display driving unit 22 and the left display driving unit 24 are in pairs. Each unit of the left display driving unit 24 has the same configuration and operation as each unit of the right display driving unit 22, and thus the detailed description thereof is omitted.

As described above, when image light which is guided to both eyes of the user of the head mounted display apparatus 100 is focused on retinas, the user sees the virtual image.

Figure 3:
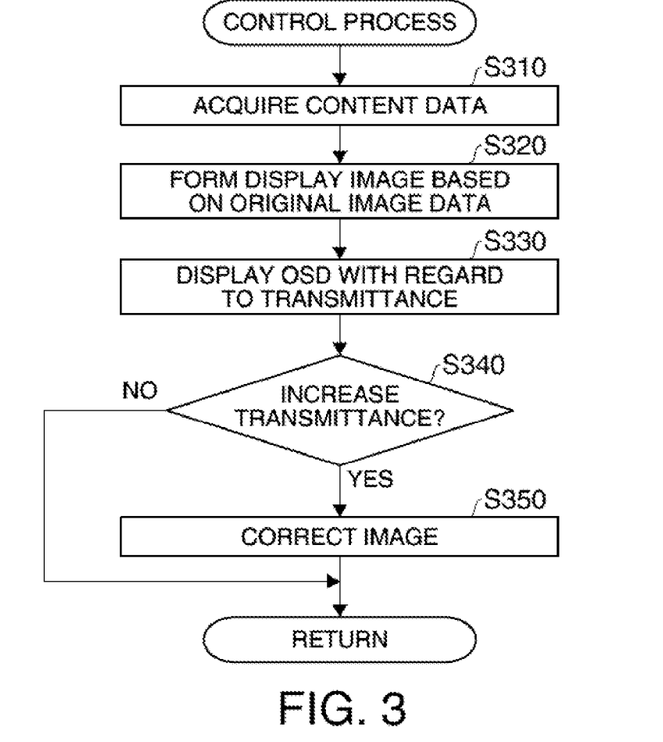
FIG. 3 is a flowchart illustrating the flow of a head mounted display apparatus control process according to the embodiment.

A-2. Control Process:

FIG. 3 is a flowchart illustrating the flow of the control process of the head mounted display apparatus 100 of the embodiment. The control process of the embodiment is a process that the display control unit 190 does not output image light in a part of pixels of image forming panels 241 and 242 and causes the user to see a corrected image, obtained by thinly cutting a part of image from an original image, as a virtual image when the operation unit 135 of the control unit 10 receives a specific operation.

First, if the user sees content such as video or an image and the operation unit 135 is operated, the CPU 140 acquires the content data of the image (hereinafter, referred to as "original image data") from the external device OA which is connected via the interface 180 in step S310. Meanwhile, the CPU 140 corresponds to an acquisition unit according to the invention.

Subsequently, the image display unit 20 displays a display image based on the original image data in step S320. The image display unit 20 generates image light based on the original image data which is acquired from the external device OA, and forms the display image on the image forming panels 241 and 242.

Figure 4:
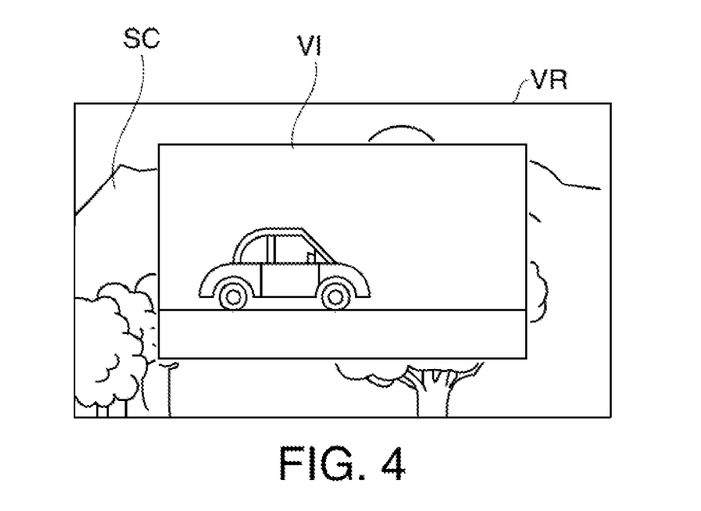
FIG. 4 is an explanatory view illustrating an example of a visual range which is seen by a user of the head mounted display apparatus according to the embodiment.

FIG. 4 is an explanatory view illustrating an example of a visual range VR which is seen by the user of the head mounted display apparatus 100 of the embodiment. As shown in FIG. 4, a display image VI is seen in the visual range VR of the user of the head mounted display apparatus 100. In addition, with respect to sections other than a section in which the display image VI is seen in the visual range VR of the user, the user can see an outside view SC through the optical image display units 26 and 28. Meanwhile, in the optical transmission-type head mounted display apparatus 100 of the embodiment, with respect to the section in which the user can see the display image VI in the visual range VR, there is a case in which the outside view SC can be seen through the behind the display image VI. However, for example, when the gradation values of the RGB components of the original image data are high, it is difficult for the user to see the outside view SC which overlaps with the display image VI (refer to FIG. 4).

Subsequently, the display control unit 190 displays notification whether or not to increase the transmittance of the display image VI on the image display unit 20 in step S330. The display control unit 190 performs arrow cursor display (hereinafter, referred to as "OSD display") in order to determine whether or not to "increase transmittance? (Y/N)" on the image forming panels 241 and 242. The user can select whether or not to increase the transmittance of the display image VI by operating the track pad 14 or the direction key 16 and the determination key 11 of the operation unit 135.

If not increasing the transmittance of the display image VI (No in step S340) is selected by operating the operation unit 135, the OSD display disappears from the image forming panels 241 and 242. For example, as shown in FIG. 4, the display image VI is continuously displayed based on the original image data. Meanwhile, the transmittance of the display image VI means a degree in which the outside view SC which overlaps with the display image VI can see through the display image VI in the visual range VR of the user.

If increasing the transmittance of the display image VI (YES in step S340) is selected by operating the operation unit 135, the OSD display disappears from the image forming panels 241 and 242 and the display control unit 190 performs image correction in order to increase the transmittance of the display image VI in step S350.

Figure 5A:
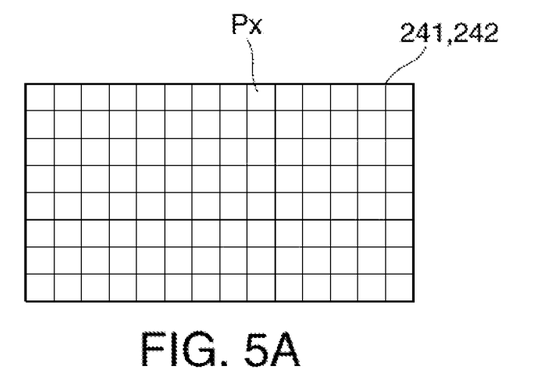
FIGS. 5A and 5B are explanatory views illustrating an image correction method in order to increase the transmittance of a display image.
Figure 5B:
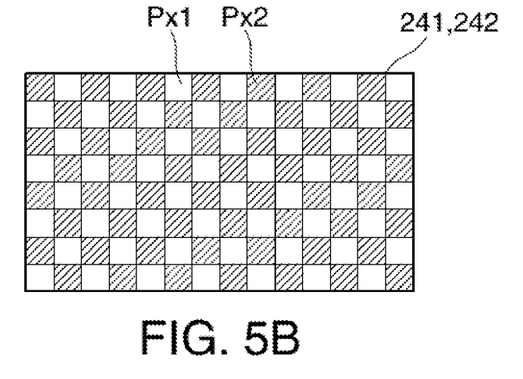

FIGS. 5A and 5B are explanatory views illustrating an image correction method in order to increase the transmittance of the display image VI. As shown in FIG. 5A, the image forming panels 241 and 242 include a plurality of pixels Px which are arranged in all directions. The image correction which is performed to increase the transmittance of the display image VI is performed by, for example, fully closing a part of the plurality of pixels Px which are included in the image forming panels 241 and 242, that is, causing image light to not penetrate therethrough. Hereinafter, the pixels which are fully closed when the image correction is performed are referred to as "non-display pixels Px2", and the other pixels are referred to as "display pixels Px1". In FIG. 5B, the non-display pixels Px2 are hatched and displayed. In an example in FIGS. 5A and 5B, the non-display pixels Px2 are arranged in a so-called zigzag shape. That is, in the image forming panels 241 and 242, the pixels Px are formed in a square lattice shape, and the non-display pixels Px2 and the display pixels Px1 are alternately arranged in the image forming panels 241 and 242. Meanwhile, the non-display pixels Px2 are not limited to the pixels which are fully closed, and include pixels Px which output image light which is reduced to a level at which the user cannot see the display image VI. In addition, the display pixels Px1 are pixels Px which are output at a level at which the user can see the display image VI. The non-display pixels Px2 correspond to a non-display pixel group in which N defined in the invention is 1, and the display pixels Px1 correspond to a display pixel group in which N defined in the invention is 1.

In order to set the state of the image forming panels 241 and 242 to a state as shown in FIG. 5B, the image processing unit 160 converts a data value corresponding to the non-display pixels Px2 into, for example, data indicative of black color (for example, (R, G, B)=(0, 0, 0)) within the original image data. Therefore, the pixels Px which correspond to black color data in the image forming panels 241 and 242 become the non-display pixels Px2 which are at a fully closed state. Meanwhile, after the user performs selection to increase the transmittance of the display image VI (YES in step S340 in FIG. 3), the arrangement of pixels PX of an arbitrary pattern, which is different from the arrangement of the pixels Px which are fully closed in the image forming panels 241 and 242, may be displayed on the optical image display units 26 and 28 to be seen by the user such that the user can select the arrangement (transmittance) of the pixels Px whenever the operation unit 135 is operated. In addition, the sizes of the individual pixels Px and the number and arrangement of pixels Px in all directions which are included in the image forming panels 241 and 242 are not limited to the aspect of the embodiment, and various modifications are possible.

Figure 6:
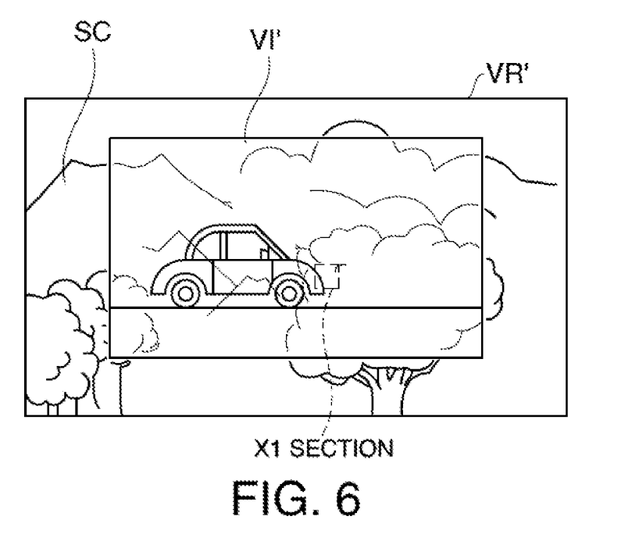
FIG. 6 is an explanatory view illustrating an example of a visual range which is seen by the user after image correction is performed.
Figure 7:
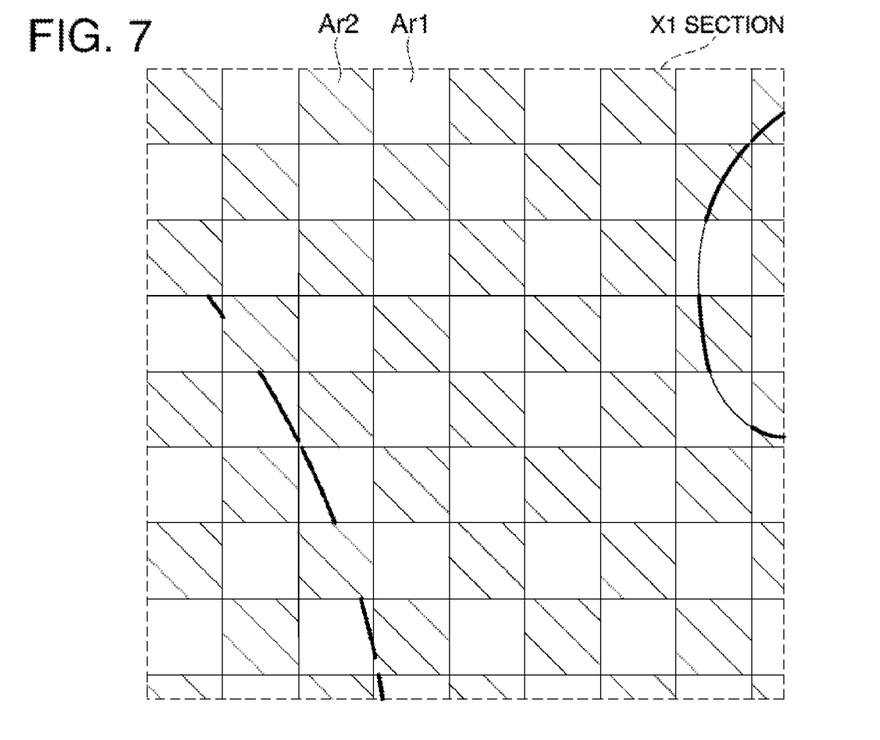
FIG. 7 is an explanatory view illustrating an example of a visual range which is seen by the user after the image correction is performed.

FIGS. 6 and 7 are explanatory views illustrating an example of a visual range VR' which is seen by the user after the image correction is performed. An image which is seen by the user after performing the image correction in order to increase the transmittance of the display image VI (hereinafter, referred to as "corrected image VI'") is an image which corresponds to image light output from only the display pixels Px1 of the plurality of pixels Px included in the image forming panels 241 and 242. Therefore, the corrected image VI' is an image which has higher transmittance than the display image VI obtained before the correction is performed. As shown in FIG. 6, in the visual range VR' obtained after the image correction is performed, a degree in which the outside view SC overlapping with the corrected image VI' can be seen is improved, compared to the visual range VR shown in FIG. 4 and obtained before the image correction is performed.

In FIG. 7, an X1 section shown in FIG. 6 is enlarged and displayed. In an area Ar1 which corresponds to a display pixel Px1 of the visual range VR' of the user, the corrected image VI' is seen and the outside view SC which penetrates the corrected image VI' is seen. On the other hand, in an area Ar2 which corresponds to a non-display pixel Px2 in the visual range VR' of the user, the corrected image VI' is not seen but the outside view SC is more clearly seen than that in the area Ar1. Therefore, after the image correction is performed in order to increase the transmittance of the display image VI, the user can sufficiently see the display image VI (the corrected image VI') while clearness decreases, and can further see the outside view SC more clearly.

As described above, in the head mounted display apparatus 100 of the embodiment, the CPU 140 acquires the original image data from the external device OA. The image display unit 20 outputs image light such that the image processing unit 160 generates image light based on the original image data and causes the user to see the display image VI. In a specific condition, the display control unit 190 performs control such that the image light of the display image VI is not output in a part of the image forming panels 241 and 242. Therefore, in the head mounted display apparatus 100 of the embodiment, since the image light of a part of the display image VI which is formed in the image forming panels 241 and 242 is not output, the user can see the outside view SC while seeing the corrected image VI' which has higher transmittance than the display image VI even when the display image VI overlaps with the outside view SC.

In addition, in the head mounted display apparatus 100 of the embodiment, the image forming panels 241 and 242 which guide the image light of the display image VI to the eyes of the user include the display pixels Px1 which output image light of the corrected image VI', and the non-display pixels Px2 which are fully closed and do not output the image light of the display image VI (the corrected image VI'). In the non-display pixels Px2, since the pixels Px are fully closed, the user cannot see the display image VI (the corrected image VI'). Therefore, in the head mounted display apparatus 100 of the embodiment, since the display control unit 190 does not output image light to the non-display pixels Px2 by fully closing a part of the pixels Px, it is possible to increase the transmittance of the display image VI using a simple method.

In addition, in the head mounted display apparatus 100 of the embodiment, the pixels Px are formed in a square lattice shape in the image forming panels 241 and 242, and the non-display pixels Px2 and the display pixels Px1 of the image forming panels 241 and 242 are alternately arranged in the image forming panels 241 and 242. Therefore, in the head mounted display apparatus 100, the non-display pixels Px2 which are fully closed in the image forming panels 241 and 242 are not biased, and thus it is possible to cause the user to see the corrected image VI' which does not cause feeling of a sense of discomfort, and it is possible to improve the visibility of the outside view SC.

In addition, in the head mounted display apparatus 100 of the embodiment, the operation unit 135 receives various types of operations from the user. Since the user can perform selection to increase the transmittance of the display image VI (the corrected image VI') by operating the operation unit 135, it is possible to enhance the convenience.

B. Second Example

Figure 8:
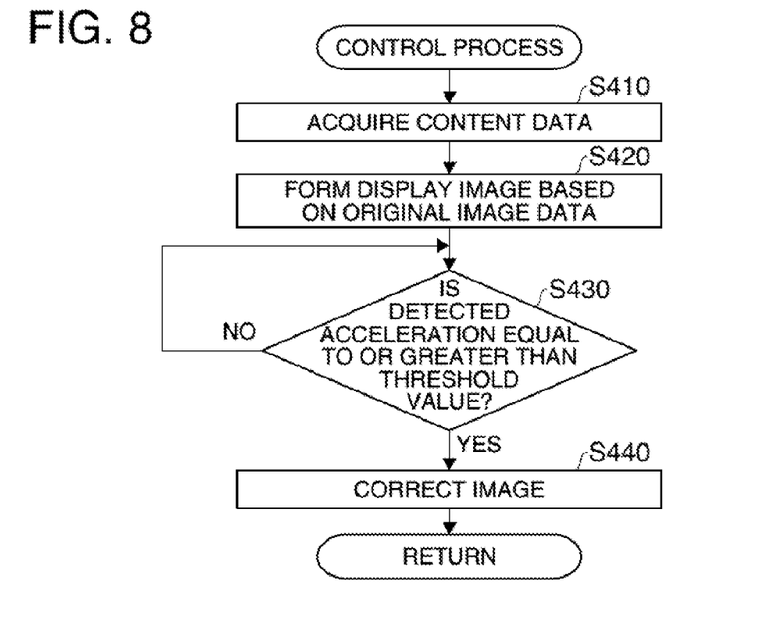
FIG. 8 is a flowchart illustrating the flow of a head mounted display apparatus control process of a second embodiment.

FIG. 8 is a flowchart illustrating the flow of the control process of the head mounted display apparatus 100 of a second example. The second example is different from the first example in that the detection unit 62 which is arranged in the image display unit 20 worn on the head of the user detects the movement of the head of the user and performs a process to increase the transmittance of the display image VI. More specifically, a control process in step S430 shown in FIG. 8 is different from that of the first example.

First, the CPU 140 acquires the original image data from the external device OA in step S410. Subsequently, the image display unit 20 displays the display image VI based on the original image data in step S420.

Subsequently, the detection processing unit 165 determines whether or not acceleration which is detected by the detection unit 62 arranged in the image display unit 20 is equal to or greater than the threshold Th1 in step S430. The detection unit 62 detects the positional state of the image display unit 20 which is worn on the user. For example, in the second example, the movement of the head is detected as acceleration in the X axis, the Y axis, and the Z axis (FIG. 1). The detected acceleration is transmitted to the detection processing unit 165 as a control signal. The detection processing unit 165 estimates the movement of the head of the user who wears the image display unit 20 based on the detected accelerations on the three axes. More specifically, the detection processing unit 165 determines whether or not composite acceleration from the three axes of the head is equal to or greater than the preset threshold Th1.

When the acceleration of the image display unit 20 which is detected by the detection unit 62 is less than the threshold Th1 (NO in step S430), the image display unit 20 continuously displays the display image VI based on the original image data.

When the acceleration of the image display unit 20 which is detected by the detection unit 62 is equal to or greater than the threshold Th1 (YES in step S430), the display control unit 190 fully closes a part of pixels Px included in the image forming panels 241 and 242 of the image display unit 20, and the image display unit 20 forms the corrected image VI' in which the transmittance is increased on the image forming panels 241 and 242, and causes the user to see the corrected image VI' in step S440.

As described above, in the head mounted display apparatus 100 of the second example, the image display unit 20 is worn on the head of the user, the operation unit 135 is arranged in the control unit 10, and the image display unit 20 is connected to the control unit 10 via the connection unit 40. The detection unit 62 is arranged in the right display driving unit 22 of the image display unit 20, and detects the positional state of the image display unit 20 depending on the acceleration of the image display unit 20. The output of image light of a part of the display image VI which is formed on the image forming panels 241 and 242 is controlled depending on detected positional state of the image display unit 20. Therefore, for example, if the user looks back when the user sees the display image VI, the transmittance of the display image VI increases, and thus it is easy for the user to see the outside view SC. Therefore, in the head mounted display apparatus 100 of the second example, since the transmittance of the display image VI changes depending on the movement of the user who wears the head mounted display apparatus 100, it is possible to provide the transmittance of the display image VI according to an object to the user even though the user does not perform a special operation.

In addition, in the head mounted display apparatus 100 of the second example, when the acceleration of the image display unit 20 which is detected by the detection unit 62 is equal to or greater than the threshold Th1, a part of pixels Px included in the image forming panels 241 and 242 is fully closed and the transmittance of the display image VI does not change with a small movement of the head of the user who wears the image display unit 20, and thus the user can see the display image VI without feeling a sense of discomfort.

C. Modification Example

Meanwhile, the invention is not limited to the above-described embodiments or modes and can be performed in various types of forms without deviating from the gist of the invention. For example, the following modifications are possible.

C1. Modification Example 1

In the head mounted display apparatus 100 of the above embodiments, the non-display pixels Px2, obtained after a part of pixels Px included in the image forming panels 241 and 242 is fully closed, are arranged in a so-called zigzag shape as shown in FIGS. 5A and 5B. However, the arrangement of the non-display pixels Px2 is not limited to that of the above-described embodiments and various modifications are possible. For example, the non-display pixels Px2 may be set by fully closing pixels Px of a predetermined vertical line in the plurality of pixels Px which are simply arranged in a square lattice shape. In addition, a ratio Rt of the number of non-display pixels Px2 to the total number of the pixels of the image forming panels 241 and 242 may be variously modified. The arrangement of the pixels Px is not limited to the square lattice shape of length and breadth, and may be a honeycomb arrangement.

In addition, in the above embodiments, it is assumed that N of the non-display pixel group and the display pixel group defined in the invention is 1 and the control unit 10 controls the pixels Px of the image display unit 20. However, with regard to N, various modifications are possible. For example, in the above first example, when N is 4, the control unit 10 may control the pixels Px as a total of 4 pixels Px in two horizontal lines and two vertical lines are assumed as a single non-display pixel group and a single display pixel group. In addition, when N is 3, the control unit 10 may control the pixels Px as a total of 3 pixels Px in three horizontal lines and one vertical line are assumed as a single non-display pixel group and a single display pixel group.

In addition, the ratio of Rt of the non-display pixels Px2 may change depending on the positions of the image forming panels 241 and 242. For example, an aspect may be used in which the ratio of Rt of the non-display pixels Px2 is low in the center of the image forming panels 241 and 242 and the ratio of Rt of the non-display pixels Px2 is high in the circumference of the image forming panels 241 and 242. In the head mounted display apparatus 100 of the Modification Example, the user easily sees the corrected image VI' in the center of the image forming panels 241 and 242 compared to the circumference thereof, and the user easily sees the penetrated outside view SC in the circumference of the image forming panels 241 and 242 compared to the center thereof. Therefore, it is possible to further easily cause the user to see the corrected image VI' and the outside view SC. Meanwhile, it is not necessary that the pixels Px in the center of the image forming panels 241 and 242 of the Modification Example should be, for example, pixels Px in the center of a horizontal axis and, may not be pixels Px in the center of a vertical axis, in the horizontal and vertical arrangement of the pixels Px on the image forming panels 241 and 242, and include pixels Px at the end of the vertical axis in the center of the horizontal axis and pixels Px in the center of the vertical axis at the end of the horizontal axis.

C2. Modification Example 2

In the head mounted display apparatus 100 of the above embodiments, the transmittance of the display image VI is increased by fully closing a part of pixels Px of the image forming panels 241 and 242. However, the transmittance of the display image VI may be further increased by decreasing the brightness of the display pixels Px1 which form the corrected image VI'. Specifically, it is possible to increase the transmittance of the display image VI on the optical image display units 26 and 28 in such a way that the right backlight control unit 201 and the left backlight control unit 202 decrease the brightness of the right backlight 221 and the left backlight 222. Therefore, in the head mounted display apparatus 100 of the Modification Example, it is possible to easily further cause the user to see the outside view SC in such a way that the image display unit 20 decreases the brightness of the display pixels Px1. Meanwhile, display control unit 190 may control the brightness of the right backlight 221 and the left backlight 222 to a different brightness.

In addition, in the above embodiments, the brightness of all the pixels Px of the right optical image display unit 26 is set to be the same using the right backlight 221, and the brightness of all the pixels Px of the left optical image display unit 28 is set to be the same using the left backlight 222. However, the brightness of a single pixel Px may be individually controlled. For example, the display control unit 190 may individually control the brightness of a single pixel Px by using EL displays as the image forming panels 241 and 242.

C3. Modification Example 3

In the head mounted display apparatus 100 of the above embodiments, the transmittance of the display image VI is increased using the operation unit 135 or the detection unit 62. However, with regard to an input method of increasing the transmittance of the display image VI, various modifications are possible. For example, when the user requests that the display image VI be reproduced based on the original image data by operating the operation unit 135, a part of pixels Px which have been set in advance may be automatically fully closed without operating the OSD display, unlike the first example. In the head mounted display apparatus 100 of the Modification Example, when the transmittance of the display image VI is increased, it is not necessary for the user to especially perform an operation other than the reproduction of the display image VI, and it is possible to improve the visibility of the outside view SC by simply increasing the transmittance of the display image VI.

In addition, the transmittance of the display image VI may be increased based on the content of the original image data. For example, an aspect may be used such that the transmittance of the display image VI is not changed when the original image data is video content, and that the transmittance of the display image VI is increased when the original image data is still image content.

In the head mounted display apparatus 100 of the Modification Example, when the original image data of the display image VI is the video content, the display image VI which is displayed is changed as time passes, and thus the display control unit 190 determines that the user pays attention to the display image and does not change the transmittance of the display image VI. In addition, when the original image data of the display image VI is the still image content, the same image is displayed regardless of the passage of time, and thus the display control unit 190 determines that it is desirable that the user can see the outside view SC and increases the transmittance of the display image VI. Therefore, in the head mounted display apparatus 100 of the Modification Example, the transmittance of the display image VI changes based on the content of the original image data, and thus it is possible to cause the user to see an appropriate corrected image VI' depending on the original image data.

In addition, in the head mounted display apparatus 100 of the second example, when the detection unit 62 detects acceleration which is equal to or greater than the threshold Th1, the transmittance of the display image VI is increased. However, in a specific case, the increased transmittance of the display image VI may be returned to the origin the initial status. For example, if, after the acceleration which is equal to or greater than the threshold Th1 is detected and the transmittance of the display image VI is increased, a predetermined time passes since the acceleration which is equal to or greater than the threshold Th1 has not been detected, the display control unit 190 releases the fully closed non-display pixels Px2, and changes the non-display pixels Px2 into the display pixels Px1 which output image light based on the original image data. In the head mounted display apparatus 100 of the Modification Example, when the detection unit 62 does not detect the movement of the head of the user within a predetermined time since the transmittance of the display image VI has been increased, it is determined that the user pays more attention to the corrected image VI' rather than the outside view SC, and the increased transmittance of the display image VI (corrected image VI') is returned to the initial status, and the user is caused to see the display image VI. Therefore, it is possible to provide the appropriate transmittance of the display image VI to which the intention of the user is reflected. Meanwhile, a method of changing the pixels Px in order to return the transmittance of the display image VI to the initial status may be variously changed, it is not necessary to change all the non-display pixels Px2 into the display pixels Px1 at a time, and the number of non-display pixels Px2 of the image forming panels 241 and 242 may be reduced together with the passage of time. In addition, as a part of non-display pixels Px2 remains, the other non-display pixels Px2 may be changed into the display pixels Px1.

C4. Modification Example 4

In the head mounted display apparatus 100 of the second example, the detection unit 62 which is arranged inside of the housing of the right display driving unit 22 detects the acceleration of the image display unit 20 which is worn on the head of the user. However, an aspect in which a state, which is related to a position in which the detection unit 62 is arranged and the position of the image display unit 20, is detected may be variously modified. The detection unit 62 may be arranged inside of the housing of the left display driving unit 24, and may be arranged in the other position of the head mounted display apparatus 100.

In addition, an infrared light reception unit may be arranged in the image display unit 20, and an infrared light emitting unit may be arranged in the operation unit 135. For example, the detection processing unit 165 receives a control signal indicative of the positional relationship between the image display unit 20 and the operation unit 135 by transmitting and receiving infrared light between the infrared light emitting unit and the infrared light reception unit. When the display image VI which is formed on the image forming panels 241 and 242 overlaps with the operation unit 135 in the visual range VR of the user, the display control unit 190 increases the transmittance of the display image VI. Therefore, when the user tries to perform an operation while seeing the operation unit 135 in order to perform a specific operation, the display control unit 190 increases the transmittance of the display image VI such that the user can see the outside view SC. Accordingly, in the head mounted display apparatus 100 of the Modification Example, since the transmittance of the display image VI automatically increases depending on the movement of the user, it is possible to improve the convenience for the user.

In addition, in the image display unit 20, a CCD camera which detects the direction which the user of the head mounted display apparatus 100 sees is used as the detection unit 62, and an operation terminal device, for example, a mobile phone is registered in the control unit 10 in advance. Thereafter, when the operation terminal device is detected, the transmittance of the display image VI may be increased. In the head mounted display apparatus 100, when the operation terminal device used with a high frequency is detected in advance depending on the intention of the user, the transmittance of the display image VI is increased in such a way that the visibility of the operation terminal device, in order to operate the operation terminal device, is prior to the display image VI which is formed on the image forming panels 241 and 242, and thus it is possible to improve the convenience for the user.

C5: Modification Example 5

In addition, in the configuration of the head mounted display apparatus 100 of the embodiments, the operating system 150, the image processing unit 160, the display control unit 190, the sound processing unit 170, and the detection processing unit 165 are implemented through the execution of software by the CPU 140. However, they may be implemented using hardware such as an electronic circuit. In addition, when a part or all of the functions of the invention are implemented using software, the software (computer program) may be provided in a form which is stored in a computer-readable recording medium. In the invention, the "computer-readable recording medium" is not limited to a portable type recording medium, such as a flexible disk or a CD-ROM, and includes various internal storage devices in a computer, such as various RAMS or ROMs, and an external storage device, such as a hard disk, which is fixed in the computer.

In addition, in the above embodiments, content data is provided from the external device OA. However, the content data may be stored in the storage unit 120 of the control unit 10 of the head mounted display apparatus 100, and an image may be formed on the image forming panels 241 and 242 based on the content data which is stored in the storage unit 120.

In addition, in the configuration of the head mounted display apparatus 100 of the embodiments, the direction key 16 which is provided in the control unit 10 may be omitted or another operational interface, such as an operational stick, may be provided in addition to the direction key 16 and the track pad 14. In addition, the control unit 10 is configured so as to connect an input device, such as a keyboard or a mouse, and may receive input from the keyboard or the mouse. In addition, a communication unit, such as a wireless LAN, may be provided in the control unit 10.

In addition, in the configuration of the head mounted display apparatus 100 of the above-described embodiments, the control unit 10 is connected to the image display unit 20 in wired manner via the connection unit 40. However, the control unit 10 may be connected to the image display unit 20 via a signal transmission path such as wireless LAN, infrared communication, or Bluetooth (registered trademark).

In addition, in the configuration of the head mounted display apparatus 100 of the above-described embodiments, the image display unit 20 is a HMD which is worn like glasses. However, the image display unit 20 may be a normal flat-panel display apparatus (a liquid crystal display apparatus, a plasma display apparatus, or an organic Electro-Luminescence (EL) display apparatus). In this case, the control unit 10 may be connected to the image display unit 20 via a wired signal transmission path or via a wireless signal transmission path. In this way, it is possible to use the control unit 10 as the remote controller of the normal flat-panel display apparatus. In addition, instead of the image display unit 20 which is worn like glasses, for example, another-shaped image display unit such as an image display unit which is worn like a hat may be used as the image display unit. In addition, the earphones 32 and 34 may be omitted.

In addition, among the components of the above-described modes, components other than those described in independent Claims are additional elements, and they may be appropriately omitted or combined with each other.

The entire disclosure of Japanese Patent Application No. 2012-059547, filed Mar. 16, 2012 is expressly incorporated by reference herein.

What is claimed is:

1. An optical transmission-type head mounted display apparatus comprising:

an acquisition unit that acquires image data;
an image display unit that generates image light based on the image data, and outputs the image light in order to cause a user to see the image light as a virtual image; and
a control unit that performs control so as to reduce an output level of the image light corresponding to a part of regions of the virtual image from among the image light to a level at which the user cannot see the virtual image in a specific condition,
wherein the image display unit includes an image forming panel which includes a plurality of pixels formed in a square lattice shape and outputs the image light,
wherein the control unit, as the control, converts a part of the plurality of pixels into non-display pixels in which the output level of the image light is reduced to the level at which the user cannot see the virtual image, and
wherein, when the control is performed, a plurality of non-display pixel groups, each of which includes N (N is an integer which is equal to or greater than 1) non-display pixels of the image forming panel, and a plurality of display pixel groups, each of which includes N display pixels outputting the output level of the image light as a level at which the user can see the virtual image, are arranged in the image forming panel such that the plurality of pixels alternates between display pixel groups and non-display pixel groups across the image forming panel.

2. The head mounted display apparatus according to claim 1
wherein, when the control is performed, a ratio of a number of non-display pixels to a total number of pixels of the image forming panel differs depending on a position on the image forming panel.

3. The head mounted display apparatus according to claim 2,
wherein the ratio in a center of the image forming panel is lower than the ratio in circumference of the image forming panel.

4. The head mounted display apparatus according to claim 1,
wherein the control includes control which is performed to reduce brightness of the display pixels which output the output level of the image light to the level at which the user can see the virtual image.

5. The head mounted display apparatus according to claim 1,
wherein the specific condition is that the image data is image data of a still image.

6. The head mounted display apparatus according to claim 1, further comprising:
an operation unit that receives an operation from the user,
wherein the specific condition is a case in which the operation unit receives an operation for performing the control.

7. The head mounted display apparatus according to claim 6,
wherein the control unit automatically performs the control when the operation unit receives an operation which causes the image display unit to generate the image light based on the image data.

8. The head mounted display apparatus according to claim 6, further comprising:
a detection unit that detects a positional state of the head mounted display apparatus,
wherein the image display unit is worn on a head of the user,
wherein the operation unit is separated from the image display unit, and
wherein the specific condition is a case in which the detected state is a specific state.

9. The head mounted display apparatus according to claim 8,
wherein the state is acceleration of the head mounted display apparatus, and
wherein the specific state is a state in which the acceleration is equal to or greater than a specific value.

10. The head mounted display apparatus according to claim 9,
wherein, if a specific time elapses from a point of time that acceleration which is equal to or greater than the specific value is not detected after the acceleration which is equal to or greater than the specific value is detected, the control unit outputs the output level of the image light corresponding to a part of the regions, the levels of which are reduced to the level at which the user cannot see the virtual image, as a level at which the user can see the virtual image.

11. The head mounted display apparatus according to claim 8,
wherein the detection unit includes a signal transmission unit which is arranged in the image display unit, and a signal reception unit arranged in the operation unit which receives a signal transmitted from the signal transmission unit,
wherein the state is a state of a positional relationship between the operation unit and the image display unit, which is acquired from the signal transmission unit and the signal reception unit, and
wherein the specific state is a state in which a position of the operation unit overlaps with the virtual image.

12. A method of controlling an optical transmission-type head mounted display apparatus which includes an image display unit causing a user to see image light as a virtual image, the method comprising:
acquiring image data;
generating the image light based on the image data; and
performing control so as to reduce an output level of the image light corresponding to a part of regions of the virtual image from among the image light to a level at which the user cannot see the virtual image in a specific condition,
wherein the image display unit includes an image forming panel which includes a plurality of pixels formed in a square lattice shape and outputs the image light,
wherein the control is performed to convert a part of the plurality of pixels into non-display pixels in which the output level of the image light is reduced to the level at which the user cannot see the virtual image, and
wherein, when the control is performed, a plurality of non-display pixel groups, each of which includes N (N is an integer which is equal to or greater than 1) non-display pixels of the image forming panel, and a plurality of display pixel groups, each of which includes N display pixels outputting the output level of the image light as a level at which the user can see the virtual image, are arranged in the image forming panel such that the plurality of pixels alternates between display pixel groups and non-display pixel groups across the image forming panel.

* * * * *